United States Patent
Futamura

(10) Patent No.: US 8,473,139 B1
(45) Date of Patent: Jun. 25, 2013

(54) HYBRID VEHICLE DRIVING APPARATUS

(71) Applicant: Aisin Seiki Kabushiki Kaisha, Kariya (JP)

(72) Inventor: Suguru Futamura, Toyohashi (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/719,853

(22) Filed: Dec. 19, 2012

(30) Foreign Application Priority Data

Dec. 22, 2011 (JP) ................................. 2011-281248

(51) Int. Cl.
*B60L 9/00* (2006.01)

(52) U.S. Cl.
USPC .................. 701/22; 701/51; 701/87; 701/90; 701/84; 180/65.1; 180/337; 318/139; 903/906; 903/905; 903/907; 903/912; 903/903

(58) Field of Classification Search
USPC .............................. 701/22; 903/903; 180/65.1
See application file for complete search history.

(56) References Cited

U.S. PATENT DOCUMENTS

| | | | |
|---|---|---|---|
| 2002/0016660 A1* | 2/2002 | Suzuki et al. | 701/62 |
| 2002/0173895 A1* | 11/2002 | Kitaori et al. | 701/51 |
| 2003/0028295 A1* | 2/2003 | Wakashiro et al. | 701/22 |
| 2005/0082992 A1* | 4/2005 | Aizawa et al. | 318/66 |

FOREIGN PATENT DOCUMENTS

| | | |
|---|---|---|
| JP | 3902044 B2 | 4/2007 |
| JP | 2008-055993 A | 3/2008 |

* cited by examiner

*Primary Examiner* — Redhwan k Mawari
(74) *Attorney, Agent, or Firm* — Buchanan Ingersoll & Rooney PC

(57) ABSTRACT

A hybrid vehicle driving apparatus includes a clutch control device and an automatic transmission control device that are connected to mutually communicate. The clutch control device sends a request to wait gear shift to the automatic transmission control device while front clutch operation is in preparation. The automatic transmission control device that receives the request to wait gear shift determines whether priority is given to engaging or disengaging the front clutch or to shifting gears of the automatic transmission. The automatic transmission control device that is determined to give priority to the front clutch operation sends out a gear shift in stand-by state signal to the clutch control device while maintaining the automatic transmission in a gear shift prepared state. The clutch control device that receives the gear shift in progress signal restrains the front clutch from engaging or disengaging while maintaining the front clutch in an operation prepared state.

5 Claims, 10 Drawing Sheets

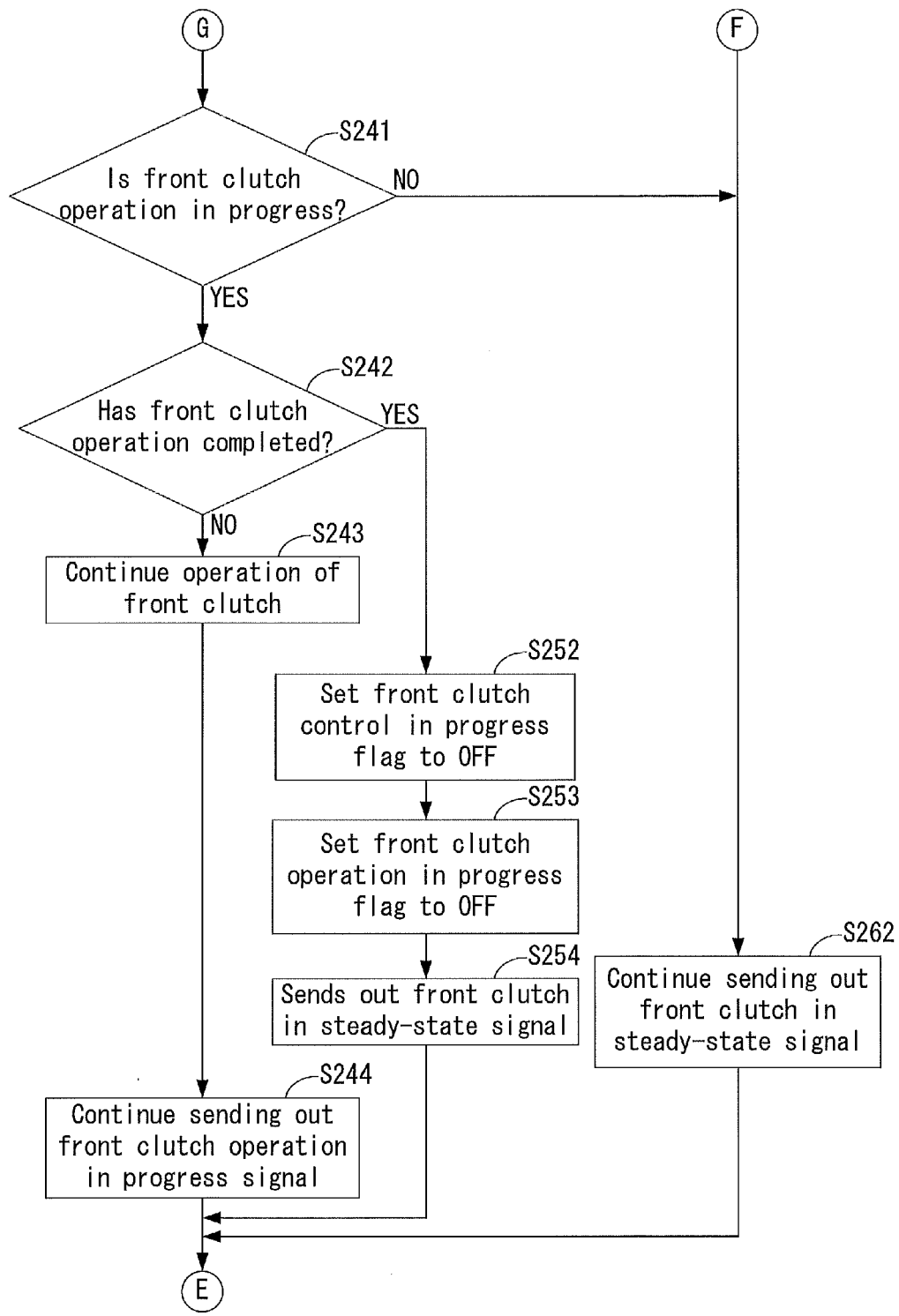

FIG. 9

Occasion where priority is given to engage front clutch

Condition for shifting gears is satisfied

| Automatic transmission side | 1st gear stage (in steady-state) | Gear shift preparation in progress R5 | Gear shift preparation in (In stand-by state) R10 | Gear shift in progress R12 | 2nd gear stage (in steady-state) |
|---|---|---|---|---|---|
| Gear shift control in progress flag | OFF | ON | | | OFF |
| Gear shift preparation in progress flag | OFF | ON | | OFF | |
| Gear shift operation in progress flag | OFF | | | ON | OFF |

← R4 Request to wait gear shift R3 ← Gear shift preparation in progress signal R6 → Gear shift in stand-by state signal R7 → Front clutch operation in progress signal R9 → Front clutch in steady-state signal R11 →

| Front clutch side | Disengaged state | Preparation for operation in progress (Synchronizing rotation) R2 | | Engagement in progress R8 | Engaged and in steady-state |
|---|---|---|---|---|---|
| Front clutch control in progress flag | OFF | | ON | | OFF |
| Front clutch operation in preparation state flag | OFF | ON | | OFF | |
| Front clutch operation in progress flag | OFF | | | ON | OFF |

↑ R1 Command to engage sent out from hybrid ECU

FIG. 10

Occasion where priority is given to shifting gears

| | Condition for shifting gears is satisfied U4↓ | | | | |
|---|---|---|---|---|---|
| Automatic transmission side | 1st gear stage (in steady-state) | Gear shift preparation in progress U5 | Gear shift in progress U7 | | 2nd gear stage (in steady-state) |
| Gear shift control in progress flag | OFF | ON | ON | | OFF |
| Gear shift preparation in progress flag | OFF | ON | | | OFF |
| Gear shift operation in progress flag | OFF | | | | OFF |
| | Request to wait gear shift U3 | Gear shift preparation in progress signal U6 | Gear shift in progress signal U8 | Steady-state signal U10 | Front clutch in steady state signal |
| Front clutch control in progress flag | OFF | ON | ON | ON | OFF |
| Front clutch operation in preparation state flag | OFF | ON | ON | | OFF |
| Front clutch operation in progress flag | OFF | | | ON | |
| Front clutch side | Disengaged state | Preparation for operation in progress (Synchronizing rotation) U2 | (In stand-by state) U9 | Engagement in progress U11 | Engaged and in steady-state |

U1 ← Command to engage sent out from hybrid ECU

HYBRID VEHICLE DRIVING APPARATUS

CROSS REFERENCE TO RELATED APPLICATIONS

This application is based on and claims priority under 35 U.S.C. §119 to Japanese Patent Application 2011-281248, filed on Dec. 22, 2011 the entire content of which is incorporated herein by reference.

TECHNICAL FIELD

This disclosure generally relates to a hybrid vehicle driving apparatus.

BACKGROUND DISCUSSION

An example of a known hybrid vehicle driving apparatus where an engine and a motor generator drive vehicle wheels is disclosed in JP2008-55993A, hereinafter referred to as Reference 1. The hybrid vehicle driving apparatus disclosed in Reference 1 includes an engine, a front clutch, a motor generator, and an automatic transmission being connected in series to provide a vehicle with the driving apparatus simultaneously using the engine and the motor generator.

The driving apparatus disclosed in Reference 1, for example, drives vehicle wheels by the motor generator when the vehicle starts moving from a stopped state. In a state where the vehicle in a running state accelerates, driving power from the engine is added to the vehicle wheels by engaging the front clutch arranged between the engine and the motor generator.

In a state where the vehicle in the running state is decelerated by providing a brake operation, the driving apparatus disclosed in Reference 1 operates a regenerative brake at the motor generator with the front clutch disengaged in order to prevent a regenerative energy being reduced by the engine rotation. The driving apparatus disclosed in Reference 1 operates the front clutch to selectively engage the engine and the motor generator depending on a situation. In a state where the front clutch engages the engine and the motor generator, an engine speed is synchronized with a motor generator speed and then transmission torque of the front clutch is gradually increased in order to reduce a shock that accompanies engagement of the front clutch.

Meanwhile, the automatic transmission shifts gears in accordance with the driving state of the vehicle acquired from an accelerator position and a vehicle speed. An example of such automatic transmission is disclosed in Japanese patent number 3902044B, hereinafter referred to as Reference 2. The automatic transmission disclosed in Reference 2 engages or disengages a multiple number of friction clutches connected to a multiple number of planetary gears to shift gears. More specifically, the automatic transmission shifts gears by reducing hydraulic pressure at the friction clutch to be disengaged of current gear shift stage to reduce transmission torque of the friction clutch to be disengaged, and by gradually increasing transmission torque of the friction clutch to be engaged of next gear shift stage by increasing hydraulic pressure at the friction clutch to be engaged.

In such automatic transmissions, a delay in reducing transmission torque of the friction clutch to be disengaged relative to increasing transmission torque of the friction clutch to be engaged results in a state known as an interlock state, which results in rapidly losing output torque. Being too fast in reducing transmission torque of the friction clutch to be disengaged relative to increasing transmission torque of the friction clutch to be engaged results in rapidly losing output torque as a result of rapid decrease of torque transmitted from an input shaft to an output shaft. In each case, a shift shock occurs, the shift shock that is considered as a decrease in shift quality.

An example of a known method to maintain shift quality of gear shift, which is described in Reference 2, is to reduce transmission torque of the friction clutch to be disengaged to generate a predetermined amount of slip at the input shaft and holding the friction clutch to be disengaged at that state until the transmission torque at the friction clutch to be engaged to increase. In order to prevent the shift shock, transmission torque of the friction clutch to be disengaged is controlled to provide the predetermined amount of slip at the input shaft, which corresponds to an increasing amount of rotation numbers. This method of controlling the transmission torque of the friction clutch to be disengaged is known as a slip amount feed back control.

In each of the hybrid vehicles in Reference 1 and Reference 2, the front clutch and the automatic transmission operate independently. As a result, in a situation where the front clutch is operated while gear shift at the automatic transmission is in progress, an input torque provided as an input at the input shaft of the automatic transmission fluctuates. The fluctuation of input at the input shaft of the automatic transmission affects the slip amount feed back control as an increase of the shift shock during gear shift at the automatic transmission.

A need thus exists for a hybrid vehicle driving apparatus, which is not susceptible to the drawback mentioned above.

SUMMARY

A hybrid vehicle driving apparatus includes an engine providing rotational driving power to driving wheels, a motor generator arranged between the engine and the driving wheels, the motor generator operating as an electric motor providing rotational driving power from the motor generator to the driving wheels and as a generator, a front clutch arranged between the engine and the motor generator, the front clutch that selectively switches the engine and the motor generator between a rotary engagement state and a disengaged state, an automatic transmission arranged between the motor generator and the driving wheels, the automatic transmission including an input shaft where the rotational driving power from the motor generator is provided as an input and an output shaft in rotary engagement with the driving wheels, the automatic transmission that selectively switches between a plurality of gear shift stages provided with different gear ratios from one another, the gear ratio, which is a value obtained by dividing number of rotations at the input shaft by number of rotations at the output shaft, a clutch control device that selectively engages the engine and the motor generator by sending out a first control signal to the front clutch and to operate the front clutch, and an automatic transmission control device that selectively switches the gear shift stages between the plurality of gear shift stages by sending out a second control signal to the automatic transmission to control gear shift. The clutch control device and the automatic transmission control device are connected to mutually communicate. The clutch control device sends out a request to wait gear shift to the automatic transmission control device in a state where preparation for an operation of the front clutch is in progress. The automatic transmission control device that receives the request to wait gear shift determines whether priority is given to engaging or disengaging the front clutch or to shifting gears of the automatic transmission.

BRIEF DESCRIPTION OF THE DRAWINGS

The foregoing and additional features and characteristics of this disclosure will become more apparent from the following detailed description considered with the reference to the accompanying drawings, wherein:

FIG. 8 is a flow chart describing processing of a front clutch control, which is a control program processed by a clutch ECU illustrated in FIG. 1;

FIG. 9 is a time flow describing an operation of the driving apparatus for the hybrid vehicle where the front clutch in disengaged state is engaged in a situation where priority is given to engaging the front clutch; and FIG. 10 is a time flow describing an operation of the driving apparatus for the hybrid vehicle where the front clutch in disengaged state is engaged in a situation where priority is given to shifting gears.

DETAILED DESCRIPTION

Figure 1:
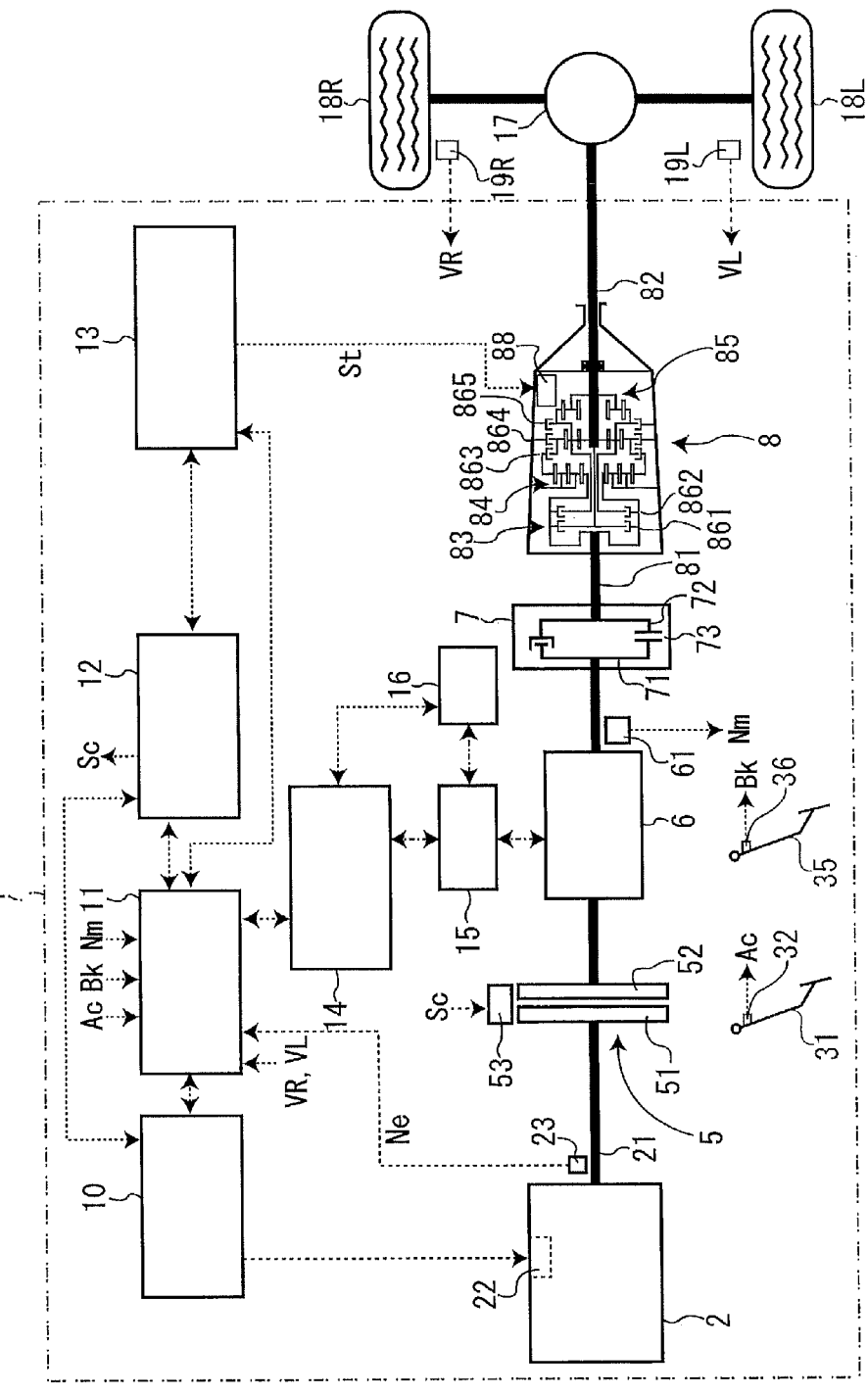
FIG. 1 is a drawing illustrating a configuration of a driving system including a driving apparatus for a hybrid vehicle according to a first embodiment.

A hybrid vehicle including a driving apparatus 1, which serves as a hybrid vehicle driving apparatus, according to a first embodiment is described referring to FIGS. 1 to 10. FIG. 1 is a drawing illustrating a general configuration of the driving apparatus 1 for a hybrid vehicle, hereinafter abbreviated as a vehicle, driven by an engine 2 and a motor generator 6. In FIG. 1, solid lines illustrate mechanical connections between separate units, arrows followed by broken lines illustrate control signal lines, and arrows followed by alternate long and short dash lines illustrate electric power supply lines.

As FIG. 1 illustrates, the vehicle includes the engine 2, a front clutch 5, the motor generator 6, a torque converter 7, an automatic transmission 8, and a differential gear unit 17 being arranged in series in the listed order. A right driving wheel 18R and a left driving wheel 18L of the vehicle connect to the differential gear unit 17. Hereinafter, the right driving wheel 18R and the left driving wheel 18L are inclusively referred to as driving wheels 18R, 18L. The driving wheels 18R, 18L refer to either front wheels or rear wheels of the vehicle, or refer to the front wheels and the rear wheels of the vehicle. The vehicle includes vehicle speed sensors 19R, 19L as vehicle speed detecting devices that detect speeds VR, VL of vehicle wheels of the driving wheels 18R, 18L or of other vehicle wheels.

An example of the engine 2 is a gasoline engine or a diesel engine, the engine using gasoline, light oil, or a similar hydrocarbon series fuel. The engine 2 includes an engine output shaft 21, throttle valves 22, and an engine speed sensor 23. An engine ECU 10 controls the engine 2. The engine output shaft 21 integrally rotates with a crankshaft that is rotationally driven by pistons to output rotational driving power. The throttle valves 22 are arranged on a path for taking in air to an inside of the engine 2. The engine ECU 10 variably controls throttle position S of the throttle valves 22. The engine speed sensor 23 is arranged near the engine output shaft 21. The engine speed sensor 23 detects an engine speed Ne, which is a number of rotations at the engine output shaft 21, and sends out a signal including the detected information to a hybrid ECU 11, which will be described later.

The engine ECU 10 controls the throttle position S of the throttle valve 22 to increase an intake amount of air in a state where the engine ECU 10 receives a command for increasing speed from the hybrid ECU 11, which will be described later. As a result, a supply of air-fuel mixture increases so that the engine speed Ne increases. The engine ECU 10 controls the throttle position S of the throttle valve 22 to decrease in a state where the engine ECU 10 receives a command for decreasing speed from the hybrid ECU 11. As a result, the engine speed Ne decreases.

The motor generator 6 includes a rotor and a stator. The motor generator 6 drives the vehicle and provides a regenerative braking force to the vehicle by generating electricity at a time of reducing speed. A three-phase synchronous machine may be used for the motor generator 6. The three-phase synchronous machine is provided with a stator and a rotor. The stator is formed by stator windings wound to slots of a stator core. The stator is arranged at an outer peripheral position of the rotor. The rotor is arranged at a central axis of the three-phase synchronous machine. The rotor is formed by embedding a permanent magnet to a rotor core. The rotor is in rotary engagement with a driven-side member 52 of the front clutch 5 so that the rotor integrally rotates with the driven-side member 52. The rotor is in rotary engagement with a pump plate 71 at an input side of a torque converter 7 so that the rotor integrally rotates with the pump plate 71. At a position close to the rotor, a motor speed sensor 61 is arranged. The motor speed sensor 61 detects the motor generator speed Nm, which is a number of rotations of the rotor, and sends out a signal including the detected information to the hybrid ECU 11. The stator windings of the stator are connected to an inverter unit 15. The inverter unit 15 is connected to a battery 16.

A motor ECU 14 controls an operation of the inverter unit 15 to provide a control for switching the motor generator 6 between a drive mode and a generator mode, and to control the motor generator speed Nm. In a state where the motor ECU 14 receives a drive command from the hybrid ECU 11, the motor ECU 14 controls the inverter unit 15 so that an electric power for driving the motor generator 6 is supplied from the battery 16 to drive the motor generator 6. At the same time, the motor ECU 14 variably controls frequency and an effective value of a drive voltage in accordance with a requested motor generator speed Nmr, which is a control target. In a state where the motor ECU 14 receives a regeneration command from the hybrid ECU 11, the motor ECU 14 controls the inverter unit 15 so that the battery 16 is charged with a regenerative electric power from the motor generator 6.

The front clutch 5 brings the rotor of the motor generator 6 and the engine output shaft 21 of the engine 2 into rotary engagement or to a disengaged state. The front clutch 5 may be a wet type multiple disc friction clutch, a dry type single disc friction clutch or a similar type of clutch including a driving-side member 51 in rotary engagement with the engine output shaft 21 of the engine 2, the driven-side member 52 in rotary engagement with the rotor, and a clutch actuator 53 that operates the driving-side member 51 and the driven-side member 52 to switch a state of the driving-side member 51 and the driven-side member 52 between an engaged state and a disengaged state.

The clutch actuator 53 of the driving apparatus 1 according to the first embodiment is a hydraulic pressure operated mechanism that switches the state between the driving-side member 51 and the driven-side member 52 between the engaged state and the disengaged state by a movement of operating oil provided by using an oil pump. The front clutch 5 of the driving apparatus 1 according to the first embodiment is a normally closed type clutch that engages the driving-side member 51 and the driven-side member 52 in a state where a clutch pressure Pc, which is a hydraulic pressure of the operating oil, is not generated, and disengages the driving-side member 51 and the driven-side member 52 in a state where the clutch pressure Pc is generated.

The torque converter 7 brings the motor generator 6 and the automatic transmission 8 into rotary engagement with each other and variably adjusts rotation speed and an amount of torque to be transmitted. The torque converter 7 includes a pump plate 71 in rotary engagement with the rotor of the motor generator 6 and a turbine plate 72 in rotary engagement with an input shaft 81 of the automatic transmission 8. The torque converter 7 also includes a lock-up clutch 73 that mechanically engages the pump plate 71 and the turbine plate 72 to provide a lock-up state that maintains synchronized rotations of the pump plate 71 and the turbine plate 72.

The torque converter 7 of the driving apparatus 1 according to the first embodiment is mostly maintained in the lock-up state so that a turbine speed Nt is approximately equal to the motor generator speed Nm. As a result, the torque converter 7 is not an indispensable component. The driving apparatus 1 for a hybrid vehicle may be provided with a configuration where the rotor of the motor generator 6 and the input shaft 81 of the automatic transmission 8 are directly engaged.

The automatic transmission 8 is a device that selectively switches between a multiple number of gear shift stages provided with different gear ratios from one another. The input shaft 81 of the automatic transmission 8 is in rotary engagement with the rotor of the motor generator 6 with the torque converter 7 arranged between the input shaft 81 and the rotor. An output shaft 82 of the automatic transmission 8 is in rotary engagement with the differential gear unit 17. As FIG. 1 illustrates, the automatic transmission 8 is formed by a combination of the input shaft 81, an input switching portion 83, a single planetary gear train 84, and a compound planetary gear train 85 arranged in the listed order. A first friction device 861 and a second friction device 862 are arranged in the input switching portion 83. A third friction device 863 is arranged between the single planetary gear train 84 and the compound planetary gear train 85 to selectively engage the single planetary gear train 84 and the compound planetary gear train 85. A fourth friction device 864 and a fifth friction device 865 are arranged in the compound planetary gear train 85.

A total of five friction devices 861 to 865 are controlled by a hydraulic control mechanism 88 that uses operating oil. Each of the friction devices 861 to 865 is independently controlled to switch a state between an engaged state and a disengaged state. Each of the friction devices 861 to 865 includes a configuration that serves as a friction clutch that provides an engaged state in a state where a hydraulic pressure is applied and provides a disengaged state in a state where the hydraulic pressure is not applied. Each of the friction devices 861 to 865 serves to synchronize rotation speeds of the input shaft 81 and the output shaft 82 by frictional sliding of the friction devices 861 to 865 in a semi-engaged state. An internal configuration of the automatic transmission 8 is not limited to the configuration described herewith. Other known configurations may be applied to the automatic transmission 8.

The gear ratio of the automatic transmission 8 is a value obtained by dividing number of rotations at the input shaft 81 by number of rotations at the output shaft 82. A large gear ratio value indicates that the gear shift stage is low. Conversely a small gear ratio value indicates that the gear shift stage is high. Combinations of the engaged state and the disengaged state of the friction devices 861 to 865 are different in at least a portion for each gear ratio. More specifically, each of the friction devices 861 to 865 is in any one of four states during the automatic transmission 8 shifting gears from a gear shift stage to a next gear shift stage, which is a disengaging state 86A where a friction device is disengaged from an engaged state, an engaging state 86B where a friction device is engaged from a disengaged state, an engagement state 86C where a friction device maintains an engaged state, and a disengagement state 86D where a friction device maintains a disengaged state. Depending on a combination of a current gear shift stage, which is the gear shift stage before gears are shifted, and a next gear shift stage, which is the gear shift stage after gears are shifted, each of the friction devices 861 to 865 is predetermined to be in any one of the four states 86A to 86D.

The hybrid ECU 11 is a control device that controls operation of the vehicle as a whole. The hybrid ECU 11 controls the vehicle to start moving, to keep running, to stop, to increase speed, and to decrease speed. The hybrid ECU 11 serves as a higher order control device above the engine ECU 10, the motor ECU 14, a clutch ECU 12, which serves as a clutch control device, and a transmission ECU 13, which serves as an automatic transmission control device. The hybrid ECU 11 sends out command signals to ECUs under the control of the hybrid ECU 11, which are the engine ECU 10, the motor ECU 14, the clutch ECU 12, and the transmission ECU 13. Furthermore, the hybrid ECU 11 receives necessary information from the engine ECU 10, the motor ECU 14, the clutch ECU 12, and the transmission ECU 13. As an exception, the clutch ECU 12 and the transmission ECU 13 send out and receive some information directly between each other independently of the hybrid ECU 11. The hybrid ECU 11 obtains information of an accelerator position Ac, which is a value providing a relative amount of operation at an accelerator pedal 31, from an accelerator sensor 32 that detects an operation amount at the accelerator pedal 31. The hybrid ECU 11 obtains information of a brake position Bk, which is a value providing a relative amount of operation at a brake pedal 35, from a brake sensor 36 that detects an operation amount of the brake pedal 35. The hybrid ECU 11 further obtains other information necessary to control the running of the vehicle, for example, the speeds VR, VL of the vehicle wheels. The hybrid ECU 11 calculates a vehicle speed V from the speeds VR, VL of the vehicle wheels. The hybrid ECU 11 sends out information on a running state of the vehicle determined from the accelerator position Ac and the vehicle speed V and information of the brake position Bk to the transmission ECU 13.

The clutch ECU 12 is connected to the clutch actuator 53. The clutch ECU 12 controls the clutch actuator 53 to engage or to disengage the front clutch 5 in accordance with a command to engage or a command to disengage sent out from the hybrid ECU 11 in order to either engage or disengage between the engine output shaft 21 of the engine 2 and the rotor of the motor generator 6. The front clutch 5 provides an engaged state or a disengaged state of the engine output shaft 21 of the engine 2 and the rotor of the motor generator 6, which allows the vehicle to select a running state from following states where the driving wheels 18R, 18L are (1) driven by the motor generator 6 alone with the automatic transmission 8 arranged between the driving wheels 18R, 18L and the motor generator 6, (2) driven by the engine 2 alone, and (3) driven by the engine 2 and the motor generator 6.

The transmission ECU 13 determines most appropriate gear shift stage for the automatic transmission 8 by referring information on the running state of the vehicle obtained from the accelerator position Ac and the vehicle speed V to a gear shift map data illustrated in FIG. 2, which will be described later. The transmission ECU 13 controls the hydraulic control mechanism 88 to control the hydraulic pressure at each of the friction devices 861 to 865 and shifts the gears of the automatic transmission 8 to a gear shift stage in accordance with a given command.

In the driving apparatus 1 according to the first embodiment, the engine ECU 10, the hybrid ECU 11, the clutch ECU 12, the transmission ECU 13, and the motor ECU 14 are connected by bus of a Controller Area Network, which is abbreviated as CAN, to provide mutual communication between ECUs. The driving apparatus 1 is an apparatus configured with the engine 2, the front clutch 5, the motor generator 6, the torque converter 7, the automatic transmission 8, the inverter unit 15, the battery 16, the engine ECU 10, the hybrid ECU 11, the clutch ECU 12, which serves as the clutch control device, the transmission ECU 13, which serves as the automatic transmission control device, and the motor ECU 14 as a whole.

The gear shift map data will be described next with reference to FIG. 2. The gear shift map data is a data that serves as a reference for the transmission ECU 13 to control the automatic transmission 8 to shift gears. As FIG. 2 illustrates, the gear shift map data includes a multiple number of shift curves relating the accelerator position Ac and the vehicle speed V. In a direction where the vehicle increases speed, which is the direction from low speed toward high speed, a shift up curve for 2nd gear and a shift up curve for 3rd gear are defined in that order. In a direction where the vehicle decreases speed, which is the direction from high speed toward low speed, a shift down curve for 2nd gear and a shift down curve for 1st gear are defined in that order. Shift curves are similarly defined for gear shift stages higher than the gear shift stages mentioned herewith.

Figure 2:
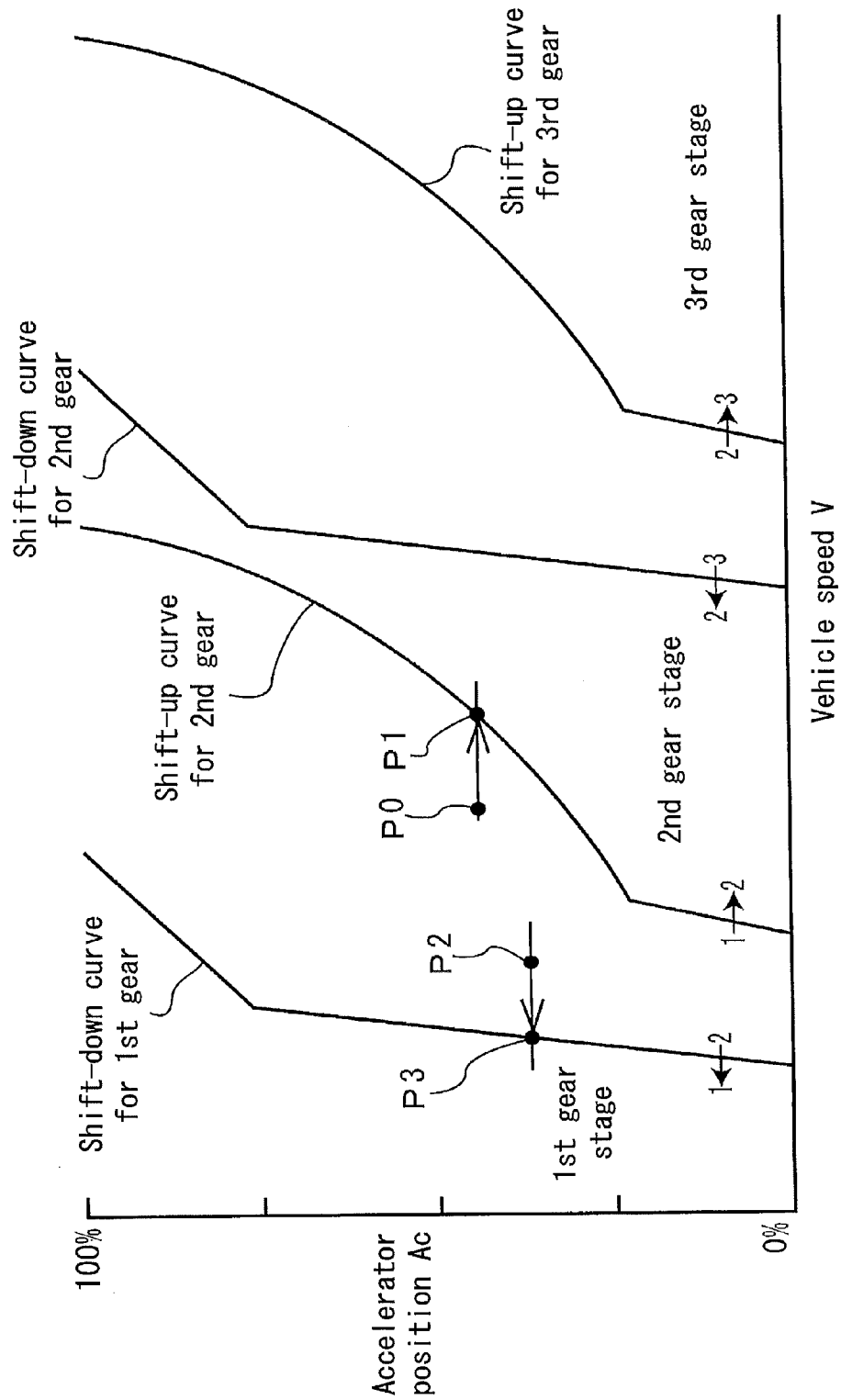
FIG. 2 is a shift diagram of a transmission, which is a graph illustrating a relation between a vehicle speed on a horizontal axis and an accelerator position on a vertical axis.

In FIG. 2, P0 indicates the vehicle running with the gear shift stage of the automatic transmission 8 in 1st gear. In a state where the vehicle in a running state of P0, which is gradually increasing the vehicle speed V, reaches a point P1 on the shift up curve for 2nd gear, the transmission ECU 13 determines that a condition for shifting gears from 1st gear stage to 2nd gear stage is satisfied. P2 indicates the vehicle running with the gear shift stage of the automatic transmission 8 in 2nd gear. In a state where the vehicle in a running state of P2, which is gradually decreasing the vehicle speed V, reaches a point P3 on the shift down curve for 1st gear, the transmission ECU 13 determines that a condition for shifting gears from the 2nd gear stage to the 1st gear stage is satisfied. In accordance with the condition for shifting gears, the hydraulic control mechanism 88 shifts gears of the automatic transmission 8 to the gear shift stage in accordance with the given command by controlling the hydraulic pressure at each of the friction devices 861 to 865.

A running method of the vehicle illustrated in FIG. 1 in general and an operation of the front clutch 5 will be described next with references to FIGS. 2 and 3. At a start of the vehicle, the front clutch 5 is in the disengaged state. Rotational driving power of the motor generator 6 drives the driving wheels 18R, 18L with the automatic transmission 8 arranged between the motor generator 6 and the driving wheels 18R, 18L. The hybrid ECU 11 controls the motor generator 6 so that the motor generator 6 outputs a predetermined rotational driving power. The rotational driving power of the motor generator 6 is transmitted to the automatic transmission 8 and then transmitted to the driving wheels 18R, 18L with the differential gear unit 17 arranged between the automatic transmission 8 and the driving wheel 18R, 18L so that the vehicle runs by the rotational driving power of the motor generator 6.

At the start of the vehicle, the automatic transmission 8 is in 1st gear, so that the vehicle runs on the 1st gear stage. As in FIG. 3 at SP1 indicates, in a state where the vehicle starts moving, the vehicle speed V and the motor generator speed Nm of the motor generator 6 gradually increase. While the vehicle is running with the rotational driving power of the motor generator 6 alone, the engine 2 is at a stop or is running at an idling state engine speed.

In a state where, for example, the vehicle accelerates, or where the vehicle speed V of the vehicle has increased, and the transmission ECU 13 determines that a running state of the vehicle has crossed the shift up curve for 2nd gear as illustrated in FIG. 2, the transmission ECU 13 sends out a command to shift gears to the hydraulic control mechanism 88 so that the gears shift to 2nd gear. In accordance with the command to shift gears, the hydraulic control mechanism 88 shift gears to bring the gear stage to the 2nd gear stage, which is indicated in FIG. 3 at SP2. The vehicle runs on the 2nd gear stage with the rotational driving power of the motor generator 6 alone.

In a state where the accelerator pedal 31 is pressed forward while the vehicle is running, which is a situation where the vehicle is determined to increase speed, the front clutch 5 engages the engine output shaft 21 of the engine 2 with the rotor of the motor generator 6 so that the vehicle runs on rotational driving power of the engine 2 in addition to the rotational driving power of the motor generator 6.

Figure 3:
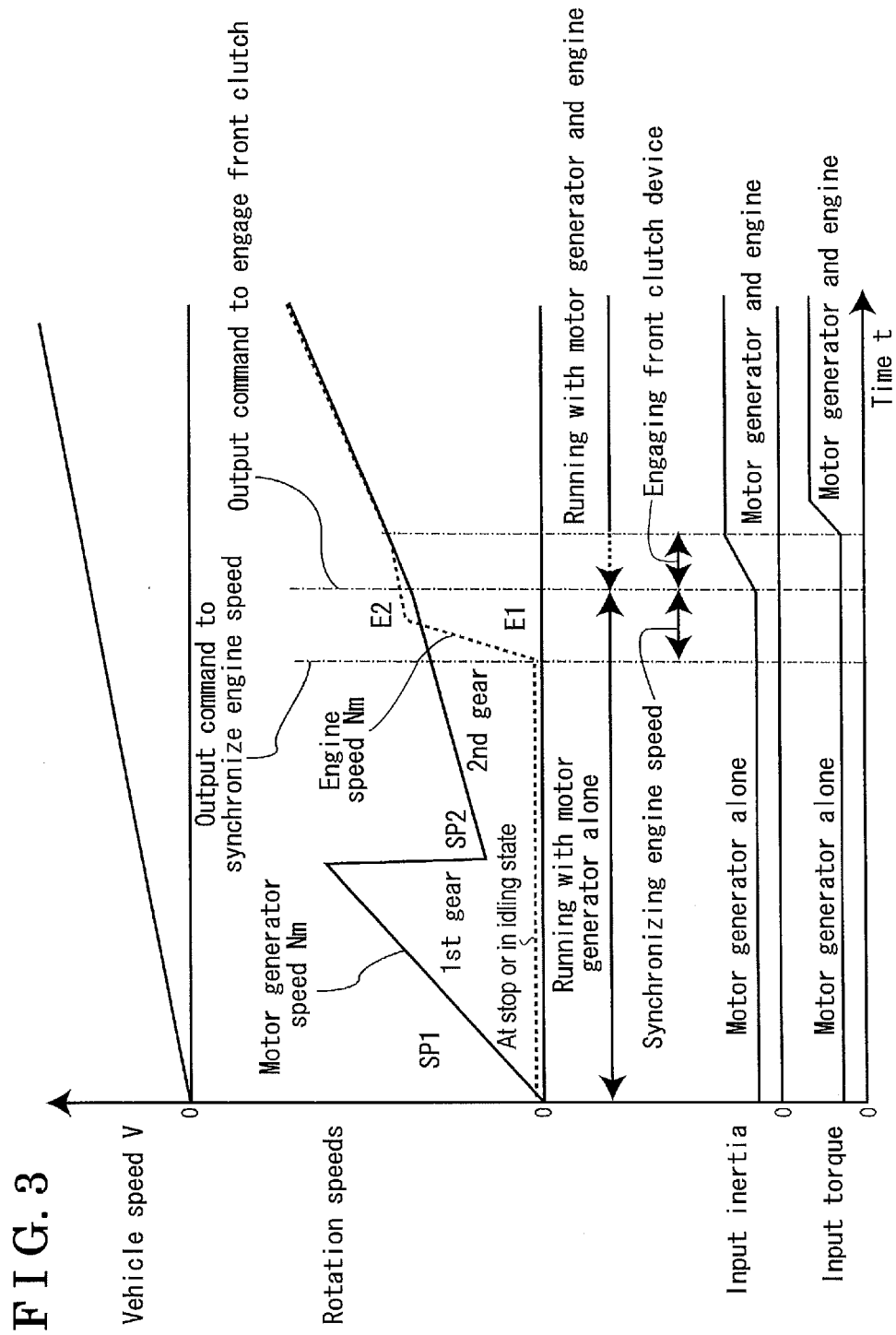
FIG. 3 is a graph illustrating a state of the hybrid vehicle at a restart, which is a graph illustrating a relation between an elapsed time on a horizontal axis and the vehicle speed, a motor generator speed, an engine speed, an input inertia, and an input torque on a vertical axis.

More specifically, as E1 in FIG. 3 illustrates, the hybrid ECU 11 sends out a command to synchronize to the engine ECU 10 to synchronize the engine speed Ne of the engine 2 to the motor generator speed Nm of the motor generator 6. As E2 in FIG. 3 illustrates, in a state where the engine speed Ne of the engine 2 is synchronized to the motor generator speed Nm of the motor generator 6, the hybrid ECU 11 sends out the command to engage to the clutch ECU 12. The clutch ECU 12 gradually engages the front clutch 5 in accordance with the command to engage received from the hybrid ECU 11. At a time at which the front clutch 5 engages, an input inertia provided as an input to the input shaft 81 of the automatic transmission 8 increases by an amount of the rotational inertia of the engine 2. In a state where engagement of the front clutch 5 has completed, the hybrid ECU 11 sends out an engine operation signal to the engine ECU 10. The engine ECU 10 controls the engine speed of the engine 2 in accordance with the engine operation signal. Accordingly, an input torque provided as an input to the input shaft 81 of the automatic transmission 8 increases by an amount of the input torque the engine 2 outputs.

In a state where the accelerator pedal 31 is brought to a full close position, or in a state where the brake pedal 35 is pressed, the front clutch 5 is disengaged and then the motor generator 6 is controlled to serve as a regenerative brake. As a result, electric power is recovered by the motor generator 6 and charged to the battery 16. Kinetic energy of the vehicle is recovered as electric power in a state where the front clutch 5 is disengaged. Accordingly, a decrease in recovery amount of electric power due to the rotational resistance of the engine 2 is restrained and the kinetic energy of the vehicle is effectively recovered as electric power. The front clutch 5 may be engaged to generate a braking force generated by rotation of the engine 2 to provide an engine brake in order to increase the braking force that applies to the vehicle.

Figure 4:
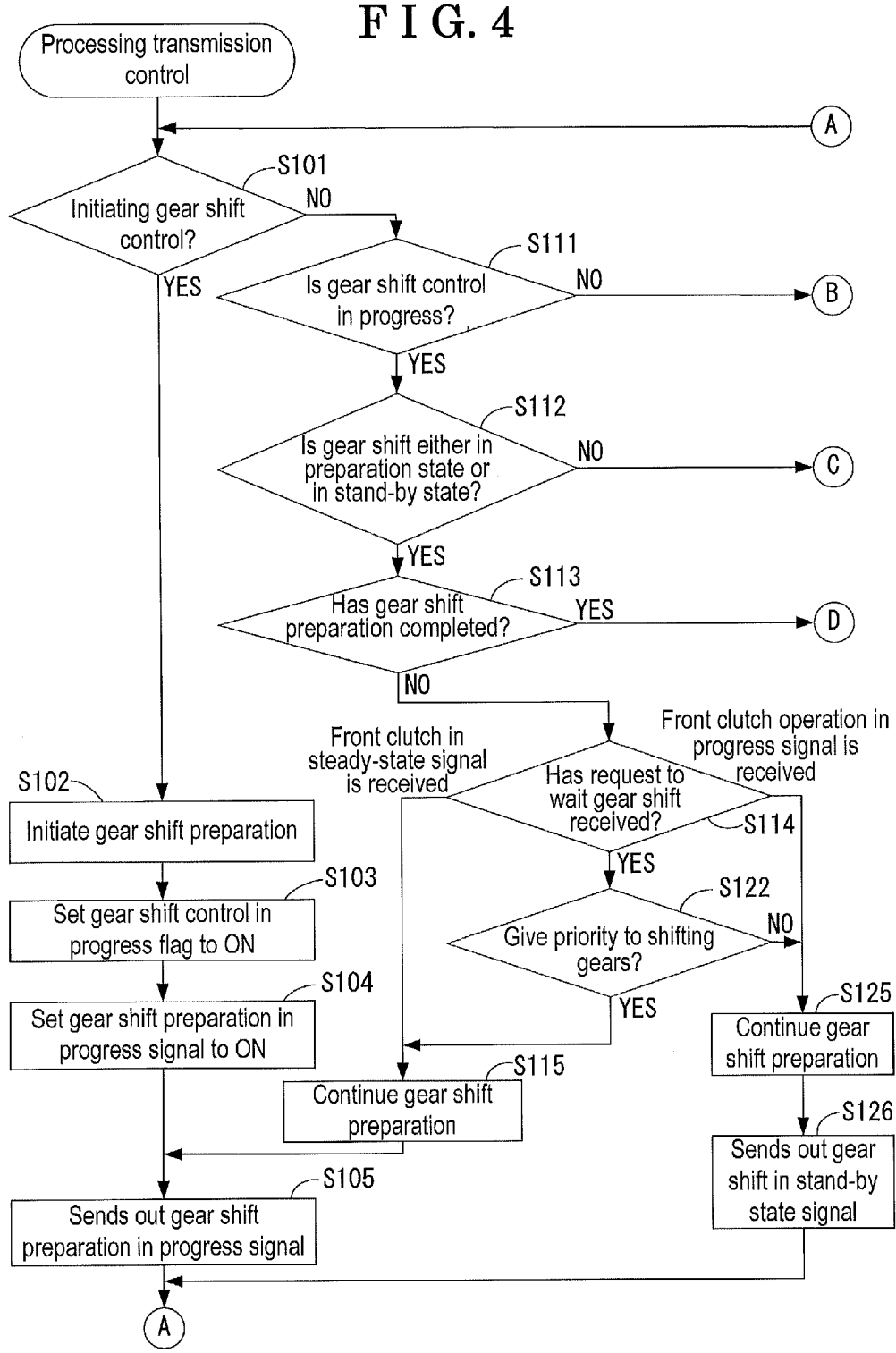
FIG. 4 is a flow chart describing processing of a transmission control, which is a control program processed by a transmission ECU illustrated in FIG. 1.
Figure 5:
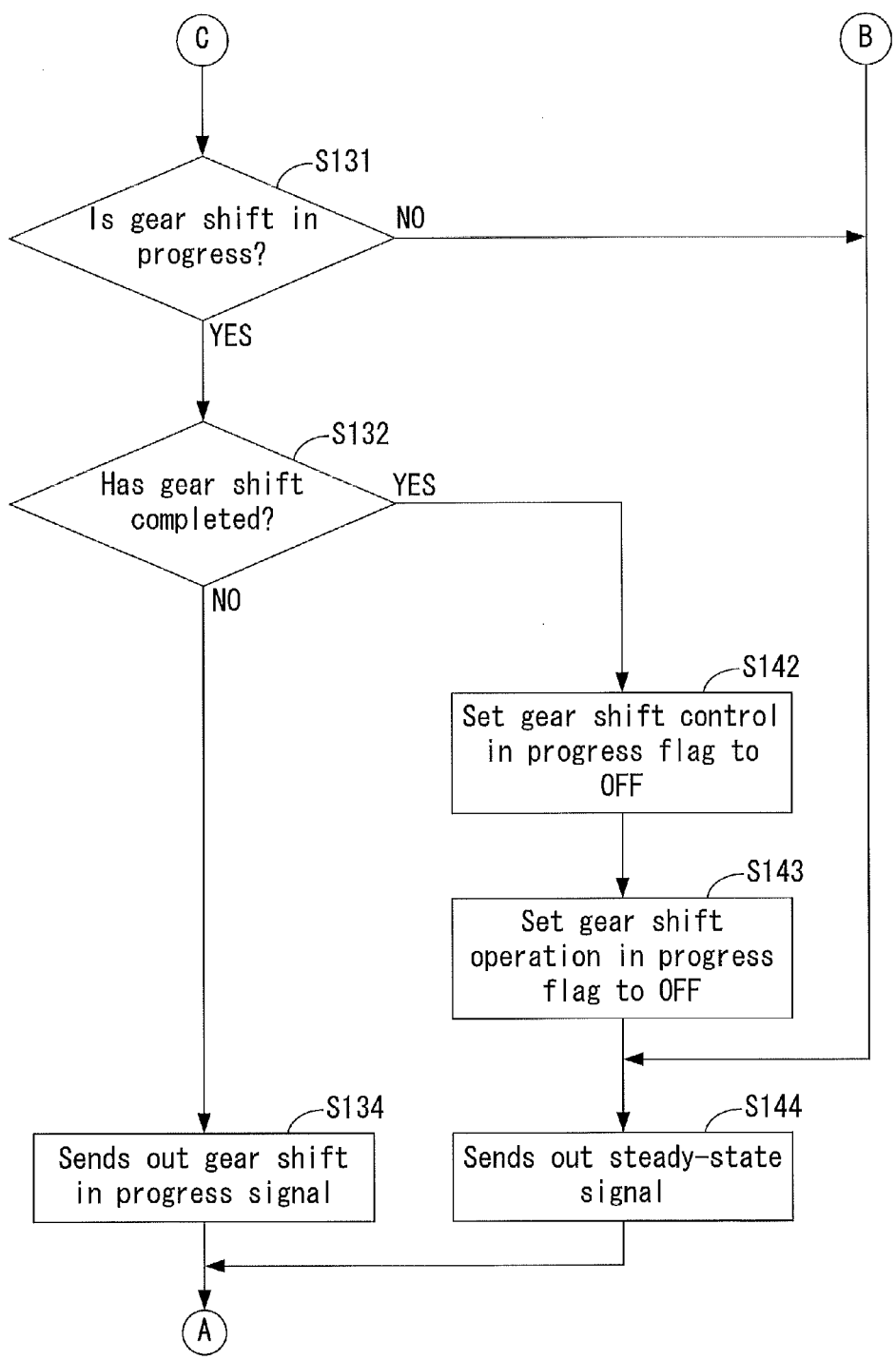
FIG. 5 is a flow chart describing processing of a transmission control, which is a control program processed by a transmission ECU illustrated in FIG. 1.
Figure 6:
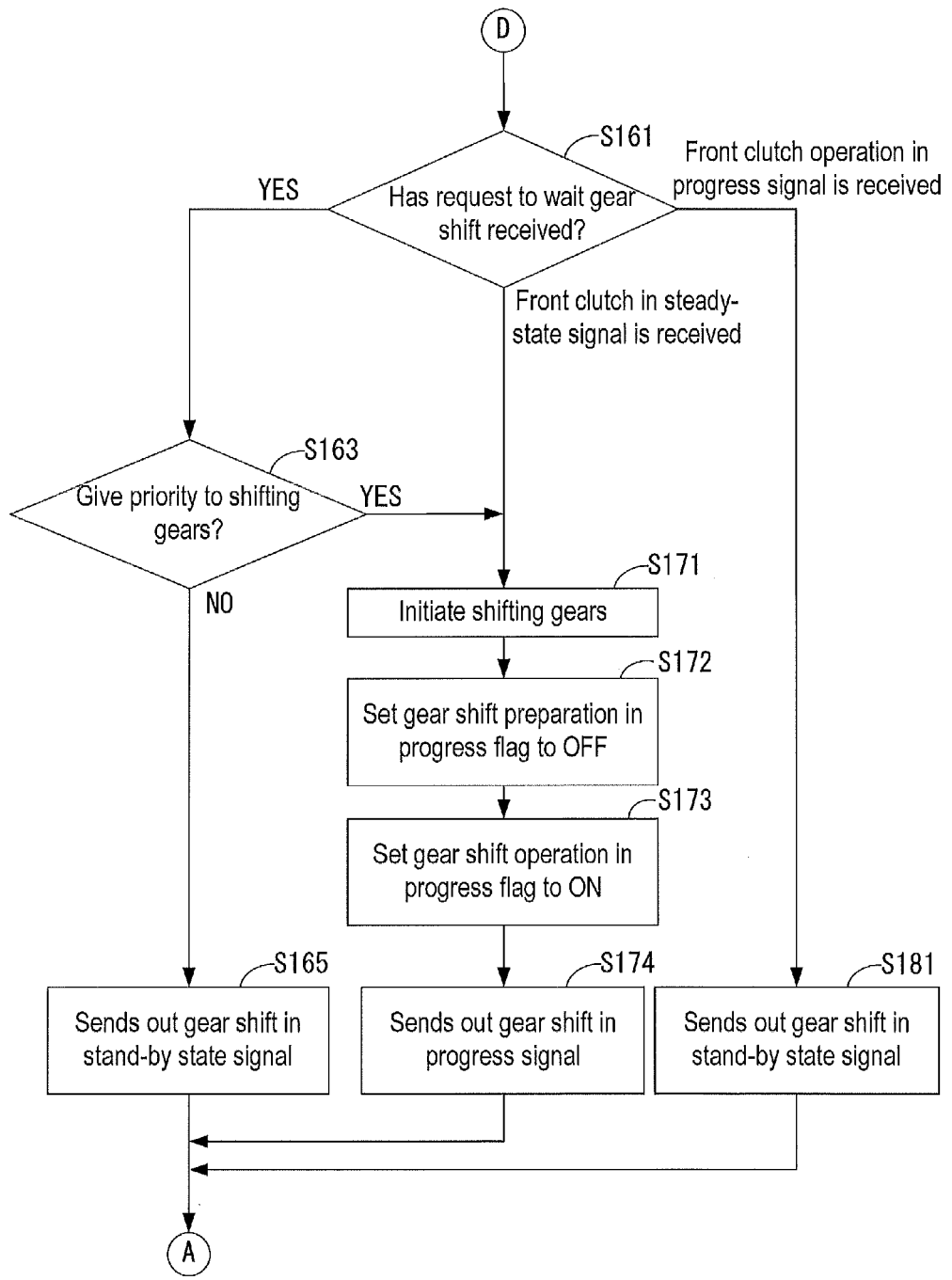
FIG. 6 is a flow chart describing processing of a transmission control, which is a control program processed by a transmission ECU illustrated in FIG. 1.

Referring to FIGS. 4 to 6, processing of gear shift control will be described next with descriptions of operations of the transmission ECU 13. Note that, the transmission ECU 13 stores received information in memory. In a state where the vehicle is prepared to run, the transmission ECU 13 determines whether to initiate or not to initiate a program for gear shift control at a step indicated as S101 in a flow of processing gear shift control. More specifically, in a state where a running state of the vehicle has crossed a shift curve shown in FIG. 2 and the transmission ECU 13 determines that a condition for shifting gears is satisfied, which is a situation where a response to the question at the step S101 is YES, the program proceeds to a step S102 to initiate the gear shift control. In a state where the transmission ECU 13 determines that the condition for shifting gears is not satisfied, which is a situation where the response to the question at the step S101 is NO, which includes a state where the gear shift control is already in progress, the program proceeds to a step S111.

At the step S102, the transmission ECU 13 sends out a command to prepare gear shift to the automatic transmission 8 to initiate gear shift preparation at the automatic transmission 8. The automatic transmission 8 that received the command to prepare gear shift initiates preparation for shifting gears, which includes switching of a hydraulic circuit and other operations for preparing the automatic transmission 8 to promptly shift gears. At the completion of the step S102, the program proceeds to a step S103.

The transmission ECU 13 sets a gear shift control in progress flag shown in FIGS. 9 and 10 to ON at the step S103 and sets a gear shift preparation in progress flag shown in FIGS. 9 and 10 to ON at a step S104, and then the program proceeds to a step S105. At the step S105, the transmission ECU 13 sends out a gear shift preparation in progress signal to the clutch ECU 12 and then the program returns to the step S101.

In a state where the transmission ECU 13 determines that the gear shift control in progress flag shown in FIGS. 9 and 10 is ON at the step S111, the transmission ECU 13 determines that the gear shift control is in progress, which is a situation where a response to a question at the step S111 is YES, the program proceeds to a step S112. In a state where the transmission ECU 13 determines that the gear shift control in progress flag is OFF at the step S111, the transmission ECU 13 determines that the gear shift control is not in progress, which is a situation where the response to the question at the step S111 is NO, the program proceeds to a step S144, the step shown in FIG. 5.

At the step S112, the transmission ECU 13 determines whether a state of gear shift is in either preparation state or in stand-by state, or not in either preparation state or in stand-by state in accordance with a state of the gear shift preparation in progress flag shown in FIGS. 9 and 10. Note that the gear shift in stand-by state is a state where gear shift preparation has completed and the automatic transmission 8 is waiting to initiate gear shift operation. In a state where the transmission ECU 13 determines that the gear shift preparation in progress flag is ON, which is a situation where a response to a question at the step S112 is YES, the program proceeds to the step S113. In a state where the transmission ECU 13 determines that the gear shift preparation in progress flag is OFF, which is a situation where the response to the question at the step S112 is NO, the program proceeds to the step S131.

In a state where the transmission ECU 13 determines that the gear shift preparation has completed at the step S113, which is a situation where a response to a question at the step S113 is YES, the program proceeds to a step S161, the step shown in FIG. 6. In a state where the transmission ECU 13 determines that the gear shift preparation has not completed at the step S113, which is a situation where the response to the question at the step S113 is NO, the program proceeds to a step S114. In a state where the transmission ECU 13 determines that the transmission ECU 13 has received a request to wait gear shift at the step S114, which is a situation where a response to a question at the step S114 is YES, the program proceeds to a step S122. In a state where the transmission ECU 13 determines that the transmission ECU 13 has received a front clutch in steady-state signal at the step S114, the program proceeds to a step S115. In a state where the transmission ECU 13 determines that the transmission ECU 13 has received a front clutch operation in progress signal at the step S114, the program proceeds to a step S125. At the step S115, the transmission ECU 13 continues the gear shift preparation of the automatic transmission 8 and proceeds the program to the step S105.

At the step S122, the transmission ECU 13 determines, or makes a decision on, whether to give priority to shifting gears or to the operation of the front clutch 5 based on information obtained from the hybrid ECU 11 and on following three criteria.

(1) The transmission ECU 13 gives priority to engaging the front clutch 5 in a situation where the front clutch 5 is in the disengaged state, a request amount of driving power has increased while the motor generator 6 is in a regenerating state, and a rotational driving force from the engine 2 is to be added to the driving wheels 18R, 18L by engaging the front clutch 5.

(2) The transmission ECU 13 gives priority to shifting gears in a situation where the vehicle running in low speed, the vehicle provided with the motor generator 6 in a regenerating state and provided with the front clutch 5 in the disengaged state, further decreases speed of the vehicle by pressing on the brake pedal 35 and maintains the rotation speed to be provided as an input to the automatic transmission 8 at the idling state engine speed by a motive power of the engine 2.

(3) The transmission ECU 13 gives priority to disengaging the front clutch 5 in a situation where the front clutch 5 is in the engaged state, request amount of driving power of the vehicle running with the rotational driving power of the engine 2 becomes zero by releasing the accelerator pedal 31, and the front clutch 5 is to be disengaged to bring the motor generator 6 to the regenerating state.

In a state where the transmission ECU 13 determines to give priority to shifting gears at the step S122, which is a situation where the response to the question at the step S122 is YES, the program proceeds to the step S115. In a state where the transmission ECU 13 determines to give priority to the operation of the front clutch 5, which is a situation where the response to the question at the step S122 is NO, the program proceeds to the step S125.

At the step S125, the transmission ECU 13 continues the gear shift preparation of the automatic transmission 8 and proceeds the program to a step S126. At the step S126, the transmission ECU 13 sends out a gear shift in stand-by state signal to the clutch ECU 12 and then the program returns to the step S101.

In a state where the transmission ECU 13 determines that a gear shift operation in progress flag is ON at the step S131, which is a situation where a response to a question at the step S131 is YES, the program proceeds to a step S132. In a state where the transmission ECU 13 determines that the gear shift control in progress flag is OFF at the step S131, which is a situation where the response to the question at the step S131 is NO, the program proceeds to the step S144.

In a state where the transmission ECU 13 determines that shifting of gears has not completed in the automatic transmission 8 at the step S132, which is a situation where a response to a question at the step S132 is NO, the program proceeds to a step S134. In a state where the transmission ECU 13 determines that shifting of gears has completed in the automatic transmission 8 at the step S132, which is a situation where the response to the question at the step S132 is YES, the program proceeds to a step S142. At the step S134, the transmission ECU 13 sends out a gear shift in progress signal to the clutch ECU 12 and then the program returns to the step S101.

The transmission ECU 13 sets the gear shift control in progress flag shown in FIGS. 9 and 10 to OFF at the step S142 and sets a gear shift operation in progress flag to OFF at the step S143 and then the program proceeds to the step S144. At the step S144, the transmission ECU 13 sends out a steady-state signal to the clutch ECU 12 and then the program returns to the step S101.

In a state where the transmission ECU 13 determines that the transmission ECU 13 has received the request to wait gear shift at the step S161, which is a situation where a response to a question at the step S161 is YES, the program proceeds to a step S163. In a state where the transmission ECU 13 determines that the transmission ECU 13 has received a front clutch in steady-state signal at the step S161, the program proceeds to a step S171. In a state where the transmission ECU 13 determines that the transmission ECU 13 has received a front clutch operation in progress signal at the step S161, the program proceeds to a step S181.

At the step S163, the transmission ECU 13 determines whether to give priority to shifting gears or to the operation of the front clutch 5 based on the criteria the step S122 bases on. In a state where the transmission ECU 13 determines to give priority to shifting gears, which is a situation where a response to a question at the step S163 is YES, the program proceeds to the step S171. In a state where the transmission ECU 13 determines to give priority to the operation of the front clutch 5, which is a situation where the response to the question at the step S163 is NO, the program proceeds to a step S165.

At the step S165, the transmission ECU 13 sends out a gear shift in stand-by state signal to the clutch ECU 12 and then the program returns to the step S101.

At the step S171, the transmission ECU 13 sends out a control signal St to initiate gear shift, the control signal St which serves as a second control signal, to the hydraulic control mechanism 88 to initiate gear shift in the automatic transmission 8 and then the program proceeds to a step S172. The transmission ECU 13 sets the gear shift preparation in progress flag shown in FIGS. 9 and 10 to OFF at the step S172, sets the gear shift operation in progress flag to ON at a step S173, and then the program proceeds to a step S174. At the step S174, the transmission ECU 13 sends out the gear shift in progress signal to the clutch ECU 12 and then the program returns to the step S101. At the step S181, the transmission ECU 13 sends out the gear shift in stand-by state signal to the clutch ECU 12 and then the program returns to the step S101.

Figure 7:
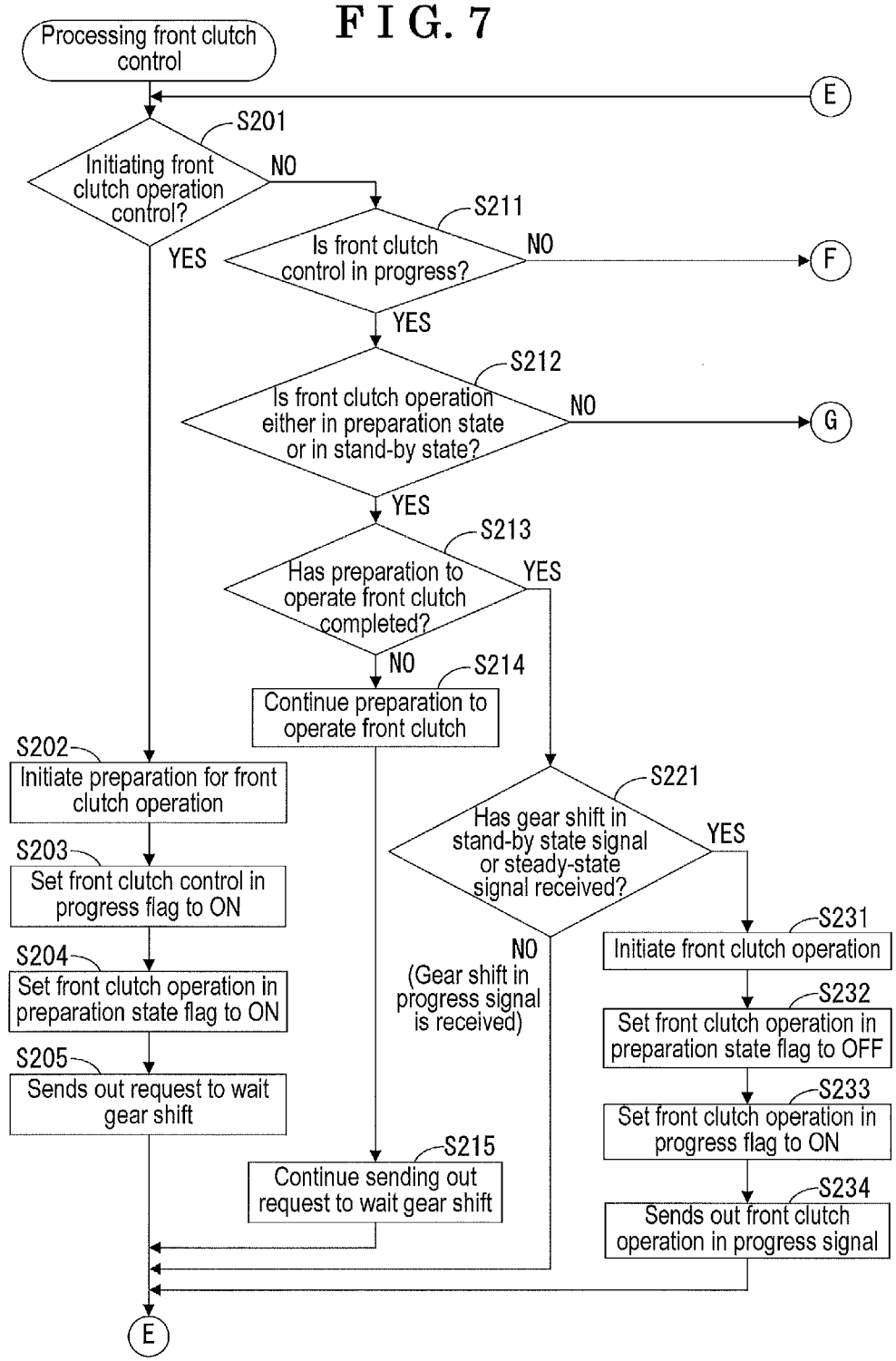
FIG. 7 is a flow chart describing processing of a front clutch control, which is a control program processed by a clutch ECU illustrated in FIG. 1.

Referring to FIGS. 7 and 8, processing of front clutch control will be described next with descriptions of operations of the clutch ECU 12. Note that, the clutch ECU 12 stores received information in memory. In a state where the vehicle is prepared to run, the clutch ECU 12 determines whether to initiate or not to initiate a program for front clutch control at a step indicated as S201 in a flow of processing front clutch control. More specifically, in a state where the clutch ECU 12 has received either the command to engage or the command to disengage from the hybrid ECU 11, which is a situation where a response to a question at the step S201 is YES, the program proceeds to a step S202 to initiate the front clutch operation control. In a state where the clutch ECU 12 has not received the command to engage or the command to disengage, which is a situation where the response to the question at the step S201 is NO, the program proceeds to a step S211.

At the step S202, the clutch ECU 12 initiates preparation for the operation of the front clutch 5. More specifically, the clutch ECU 12 sends out a control signal Sc, which serves as the first control signal, to the clutch actuator 53 to initiate preparations for operating the front clutch 5. The preparations include switching of a hydraulic circuit of the clutch actuator 53 and other operations for preparing the front clutch 5 to promptly operate. In a situation where the front clutch 5 engages from the disengaged state, the clutch ECU 12 sends out a command to synchronize engine speed to the engine ECU 10. The engine ECU 10 that received the command to synchronize engine speed sends out a signal to initiate synchronization to the engine 2 so that the engine 2 initiates the operation to synchronize the engine speed Ne, which is the rotation speed of the engine output shaft 21 of the engine 2, to the motor generator speed Nm, which is the rotation speed of the rotor of the motor generator 6. At the completion of the step S202, the program proceeds to a step S203.

The clutch ECU 12 sets a front clutch control in progress flag shown in FIGS. 9 and 10 to ON at the step S203, sets a front clutch operation in preparation state flag to ON at a step S204, and then the program proceeds to a step S205. At the step S205, the clutch ECU 12 sends out the request to wait gear shift to the transmission ECU 13 and then the program returns to the step S201.

In a state where the clutch ECU 12 determines that the front clutch control in progress flag shown in FIGS. 9 and 10 is ON at the step S211, which is a situation where a response to a question at the step S211 is determined as YES, the program proceeds to a step S212. In a state where the clutch ECU 12 determines that the front clutch control in progress flag is OFF at the step S211, which is a situation where the response to the question at the step S211 is NO, the program proceeds to a step S262, the step shown in FIG. 8.

At the step S212, the clutch ECU 12 determines whether a state of the front clutch operation is in either preparation state or in stand-by state, or not in either preparation state or in stand-by state in accordance with a state of the front clutch operation in preparation state flag shown in FIGS. 9 and 10. Note that the front clutch operation in stand-by state is a state where preparation to operate the front clutch has completed. In a state where the clutch ECU 12 determines that the front clutch operation in preparation state flag is ON, which is a situation where a response to a question at the step S212 is YES, the program proceeds to a step S213. In a state where the clutch ECU 12 determines that the front clutch operation in preparation state flag is OFF, which is a situation where a response to a question at the step S212 is NO, the program proceeds to a step S241, the step shown in FIG. 8.

In a state where the clutch ECU 12 determines that the preparation to operate the front clutch 5 has completed at the step S213, which is a situation where a response to a question at the step S213 is YES, the program proceeds to a step S221. In a state where the clutch ECU 12 determines that the preparation to operate the front clutch 5 has not completed at the step S213, which is a situation where the response to the question at the step S213 is NO, the program proceeds to a step S214.

At the step S214, the clutch ECU 12 continues the preparation to operate the front clutch 5 and then the program proceeds to a step S215. At the step S215, the clutch ECU 12 continues to send out the request to wait gear shift to the transmission ECU 13 and then the program returns to the step S201.

In a state where the clutch ECU 12 determines that the clutch ECU 12 has received either the gear shift in stand-by state signal or the steady-state signal from the transmission ECU 13 at the step S221, which is a situation where a response to a question at the step S221 is YES, the program proceeds to a step S231. In a state where the clutch ECU 12 determines that the clutch ECU 12 has received a gear shift in progress signal from the transmission ECU 13 at the step S221, which is a situation where the response to the question at the step S221 is NO, the program returns to the step S201.

At the step S231, the clutch ECU 12 sends out a signal to initiate clutch operation to the clutch actuator 53 so that the operation of the front clutch 5, which is to engage or disengage the front clutch 5, is initiated and then the program proceeds to a step S232.

The clutch ECU 12 sets the front clutch operation in preparation state flag shown in FIGS. 9 and 10 to OFF at the step S232, sets the front clutch operation in progress flag shown in FIGS. 9 and 10 to ON at a step S233, and then the program proceeds to a step S234. At the step S234, the clutch ECU 12 sends out the front clutch operation in progress signal to the transmission ECU 13 and then the program returns to the step S201.

In a state where the clutch ECU 12 determines that the front clutch operation in progress flag shown in FIGS. 9 and 10 is ON at the step S241, the clutch ECU 12 determines that the operation of the front clutch 5 is in progress, which is a situation where a response to a question at the step S241 is YES, the program proceeds to a step S242. In a state where the clutch ECU 12 determines that the front clutch operation in progress flag shown in FIGS. 9 and 10 is OFF at the step S241, the clutch ECU 12 determines that the operation of the front clutch 5 is not in progress, which is a situation where the response to the question at the step S241 is NO, the program proceeds to the step S262.

In a state where the clutch ECU 12 determines that the operation of the front clutch 5 has not completed at the step S242, which is a situation where a response to a question at the step S242 is NO, the program proceeds to a step S243. In a state where the clutch ECU 12 determines that the operation of the front clutch 5 has completed at the step S242, which is a situation where a response to a question at the step S242 is YES, the program proceeds to a step S252.

At the step S243, the clutch ECU 12 continues the operation of the front clutch 5, continues sending out the front clutch operation in progress signal to the transmission ECU 13 at a step S244 and then the program returns to the step S201.

The clutch ECU 12 sets the front clutch control in progress flag to OFF at the step S252, sets the front clutch operation in progress signal to OFF at a step S253, and then the program proceeds to a step S254. At the step S254, the clutch ECU 12 sends out the front clutch in steady-state signal to the transmission ECU 13, and then the program returns to the step S201.

At the step S262, the clutch ECU 12 continues sending out the front clutch in steady-state signal to the transmission ECU 13, and then the program returns to the step S201.

An occasion where priority is given to engaging front clutch 5 will be described next. Referring to the flow charts shown in FIGS. 4 to 8 and a time chart shown in FIG. 9, a process where the front clutch 5 in the disengaged state engages on an occasion where priority is given to engaging the front clutch 5 will be described. Note that in FIG. 9, an automatic transmission side refers to the transmission ECU 13 and the automatic transmission 8 and a front clutch side refers to the clutch ECU 12 and the front clutch 5.

As R1 in FIG. 9 indicates, in a state where the clutch ECU 12 receives the command to engage from the hybrid ECU 11, which is a situation where the response to the question at the step S201 in FIG. 7 is YES, preparation for the operation of the front clutch 5 is initiated as R2 in FIG. 9 and the step S202 in FIG. 7 indicate. Then the request to wait gear shift is sent out from the clutch ECU 12 to the transmission ECU 13, as R3 in FIG. 9 and the step S205 in FIG. 7 indicate.

As R4 in FIG. 9 indicates, in a state where the condition for shifting gears is satisfied, which is a situation where the response to the question at the step S101 in FIG. 4 is YES, the gear shift preparation is initiated as R5 in FIG. 9 and the step S102 in FIG. 4 indicate. Then as R6 in FIG. 9 and the step S105 in FIG. 4 indicate, the transmission ECU 13 sends out the gear shift preparation in progress signal to the clutch ECU 12.

In an example shown in FIG. 9, the transmission ECU 13 receives the request to wait gear shift while the gear shift preparation is in progress. Accordingly, as FIG. 4 indicates, the step S114 proceeds to the step S122. At the step S122 the transmission ECU 13 determines whether to give priority to shifting gears or to the operation of the front clutch 5. In a state where the transmission ECU 13 at the step S122 determines to give priority to the operation of the front clutch 5, the gear shift in stand-by state signal is sent out from the transmission ECU 13 to the clutch ECU 12 as R7 in FIG. 9 and the step S126 in FIG. 4 indicate. Accordingly, the step S221 in FIG. 7 proceeds to the step S231 so that engaging of the front clutch 5 is initiated as R8 in FIG. 9 and the step S231 in FIG. 7 indicate. Then the clutch ECU 12 sends out the front clutch operation in progress signal to the transmission ECU 13 as R9 in FIGS. 9 and S234 in FIG. 7 indicate.

While the transmission ECU 13 is receiving the front clutch operation in progress signal, the gear shift is restrained as the step S161 proceeds to the step S181 as shown in FIG. 6 and the automatic transmission side is in a stand-by state as R10 in FIG. 9 indicates. In a state where engaging of the front clutch 5 has completed, which is the situation where the response to the question at the step S242 in FIG. 8 is YES, the clutch ECU 12 sends out the front clutch in steady-state signal to the transmission ECU 13 as R11 in FIG. 9 and the step S254 in FIG. 8 indicate so that the gear shift of the automatic transmission 8 is initiated as R12 in FIGS. 9 and S171 in FIG. 6 indicate.

An occasion where priority is given to shifting gears will be described next. Referring to the flow charts shown in FIGS. 4 to 8 and a time chart shown in FIG. 10, a process where the front clutch 5 in the disengaged state engages on an occasion where priority is given to shifting gears will be described. Note that the processes indicated as U1 to U6 in FIG. 10 are as same as processes indicated as R1 to R6 in FIG. 9 so that descriptions in detail are omitted.

In an example shown in FIG. 10, the transmission ECU 13 receives the request to wait gear shift in a state where the gear shift preparation has completed, which is the situation where the response to the question at the step S113 in FIG. 4 is YES. Accordingly the step S161 in FIG. 6 proceeds to the step S163. At the step S163, the transmission ECU 13 determines whether to give priority to shifting gears or to the operation of the front clutch 5. In a state where the transmission ECU 13 at the step S163 determines to give priority to shifting gears, gear shift is initiated as U7 in FIGS. 10 and S171 in FIG. 6 indicate and the gear shift in progress signal is sent out from the transmission ECU 13 to the clutch ECU 12 as U8 in FIGS. 10 and S174 in FIG. 6 indicate. The clutch ECU 12 is in a state where the clutch ECU 12 has received the gear shift in progress signal when the preparation for the operation of the front clutch 5 has completed, which is the situation where the response to the question at the step S213 in FIG. 7 is YES. Accordingly, the operation of the front clutch 5 is restrained, which is the situation where the response to the question at the step S221 in FIG. 7 is NO, and the front clutch 5 is in a stand-by state as U9 in FIG. 10 indicates.

In a state where the gear shift has completed, which is the situation where the response to the question at the step S132 in FIG. 5 is YES, the transmission ECU sends out the steady-state signal to the clutch ECU 12 as U10 in FIG. 10 and the step S144 in FIG. 5 indicate. Accordingly, the response to the question at the step S221 in FIG. 7 is determined as YES and engaging of the front clutch 5 is initiated as U11 in FIG. 10 and S231 in FIG. 7 indicate.

Referring to FIGS. 9 and 10, the operation of the driving apparatus 1 in a state where the front clutch 5 in the disengaged state engages is described. The operation of the driving apparatus 1 in a state where the front clutch 5 in the engaged state disengages proceeds similarly to the operation of the driving apparatus 1 described with references to FIGS. 9 and 10. Note that, in a state where the front clutch 5 in the engaged state disengages, a process of synchronizing the rotation speed of the rotor of the motor generator 6 to the rotation speed of the engine output shaft 21 of the engine 2 is omitted.

As has been described above and as illustrated in FIG. 1, the clutch ECU 12, which serves as the clutch control device, and the transmission ECU 13, which serves as the automatic transmission control device are connected such that the clutch ECU 12 and the transmission ECU 13 mutually communicate with each other. The clutch ECU 12 sends out the request to wait gear shift to the transmission ECU 13 at the steps S205 and S215 as shown in FIG. 7, which is while the operation of the front clutch 5 is in preparation. The transmission ECU 13 that has received the request to wait gear shift at the step S114 in FIG. 4 and at the step S161 in FIG. 6 determines whether to give priority to engaging or disengaging the front clutch 5 or give priority to shifting gears at the step S122 in FIG. 4 and at the step S163 in FIG. 6. Upon the arrangement where the transmission ECU 13 determines whether to give priority to the operation of the automatic transmission 8 or to the operation of the front clutch 5, the gear shift operation in the automatic transmission 8 and the operation of the front clutch 5 are restrained from operating at a same time.

In a state where the transmission ECU 13 is determined to give priority to the operation of the front clutch 5 at the step S122 in FIG. 4 and at the step S163 in FIG. 6, the transmission ECU 13 sends out the gear shift in stand-by state signal at the step S126 in FIG. 4 and at the step S165 in FIG. 6 to the clutch ECU 12 and maintains the automatic transmission 8 in the stand-by state, which is the state where preparation for shifting gears has completed. The clutch ECU 12 that received the gear shift in progress signal at the step S221 in FIG. 7 maintains the front clutch 5 in a state where preparation for the operation of the front clutch 5 has completed, which is a state where the front clutch 5 is restrained from engaging or disengaging. On the other hand, in a state where the transmission ECU 13 is determined to give priority to shifting gears at the step S122 in FIG. 4 and at the step S163 in FIG. 6, the transmission ECU 13 sends out the gear shift in progress signal at the step S174 to the clutch ECU 12 and the clutch ECU 12 that received the gear shift in progress signal maintains the front clutch 5 in the state where preparation for the operation of the front clutch 5 has completed, which is the state where the front clutch 5 is restrained from engaging or disengaging. Upon the arrangement where each of the front clutch 5 and the automatic transmission 8 are maintained in a state where preparation for the operation has completed, the operation of each of the front clutch 5 and the automatic transmission 8 may be promptly initiated when each of the front clutch 5 and the automatic transmission 8 is released from the state where the operation is restrained.

At the step S122 in FIG. 4 and at the step S163 in FIG. 6, the transmission ECU 13 determines whether to give priority to shifting gears or to the operation of the front clutch 5 based on following criteria.

(1) The transmission ECU 13 gives priority to engaging the front clutch 5 in the situation where the front clutch 5 is in the disengaged state, the request amount of driving power has increased while the motor generator 6 is in the regenerating state, and the rotational driving force from the engine 2 is to be added to the driving wheels 18R, 18L by engaging the front clutch 5. Accordingly, the rotational driving force from the engine 2 is promptly added to the driving wheels 18R, 18L so that the driving force is promptly increased.

(2) The transmission ECU 13 gives priority to shifting gears in the situation where the vehicle driving in low speed, the vehicle provided with the motor generator 6 in the regenerating state and with the front clutch 5 in the disengaged state, further decreases speed of the vehicle by pressing on the brake pedal 35 and maintains the rotation speed to be provided as the input to the automatic transmission 8 at the idling state engine speed by the motive power of the engine 2. The arrangement described herewith prevents a shift shock caused by rotation speeds between the current gear stage and the next gear stage to be shifted to being unmatched, which occurs in a state where gear shift is delayed. More specifically, the shift shock caused by a one-way clutch rapidly engaging at the gear stage after gear shift may be prevented. In addition, the arrangement described herewith prevents the vehicle from a state where the automatic transmission is unable to shift down to the 1st gear until the vehicle comes to stop.

(3) The transmission ECU 13 gives priority to disengaging the front clutch 5 in a situation where the front clutch 5 is in the engaged state, the request amount of driving power of the vehicle becomes zero, and the front clutch 5 is to be disengaged to bring the motor generator 6 to the regenerating state. Accordingly, the engine 2 and the motor generator 6 are promptly disengaged so that losing regenerative energy due to the rotation of the engine 2 may be prevented.

The front clutch 5 of the driving apparatus 1 according to the first embodiment is a normally closed type clutch, however, the front clutch 5 may be a normally open type clutch that disengages in a state where the clutch pressure Pc, which is the hydraulic pressure of the operating oil, is not generated, and engages in a state where the clutch pressure Pc is generated. The clutch actuator 53 of the driving apparatus 1 according to the first embodiment is a hydraulic pressure operated mechanism, however, the clutch actuator 53 may be electrically operated.

The automatic transmission 8 of the driving apparatus 1 according to the first embodiment is an automatic transmission provided with planetary gear mechanisms and friction devices, however, the automatic transmission 8 is not limited to an automatic transmission of such type. The automatic transmission 8 of the hybrid vehicle applied with the driving apparatus of this disclosure may be a continuously variable transmission, which may be abbreviated as CVT, a dual clutch transmission, which may be abbreviated as DCT, an automated manual transmission, which may be abbreviated as AMT, or similar.

According to an aspect of this disclosure, the driving apparatus 1 includes the engine 2 providing rotational driving power to the driving wheels 18R, 18L, the motor generator 6 arranged between the engine 2 and the driving wheels 18R, 18L, the motor generator 6 operating as the electric motor providing rotational driving power from the motor generator 6 to the driving wheels 18R, 18L and as a generator, the front clutch 5 arranged between the engine 2 and the motor generator 6, the front clutch 5 that selectively switches the engine 2 and the motor generator 6 between a rotary engagement state and a disengaged state, the automatic transmission 8 arranged between the motor generator 6 and the driving wheels 18R, 18L, the automatic transmission 8 including the input shaft 81 where the rotational driving power from the motor generator 6 is provided as the input and the output shaft 82 in rotary engagement with the driving wheels 18R, 18L, the automatic transmission 8 that selectively switches between a plurality of gear shift stages provided with different gear ratios from one another, the gear ratio, which is a value obtained by dividing number of rotations at the input shaft by number of rotations at the output shaft, the clutch ECU 12 that selectively engages the engine 2 and the motor generator 6 by sending out the control signal Sc to the front clutch 5 to operate the front clutch 5, and the transmission ECU 13 that selectively switches the gear shift stages between the plurality of gear shift stages by sending out the control signal St to the automatic transmission 8 to control gear shift. The clutch ECU 12 and the transmission ECU 13 are connected to mutually communicate. The clutch ECU 12 sends out the request to wait gear shift to the transmission ECU 13 in a state where preparation for the operation of the front clutch 5 is in progress. The transmission ECU 13 that receives the request to wait gear shift determines whether priority is given to engaging or disengaging the front clutch 5 or to shifting gears of the automatic transmission 8.

Upon the arrangement described herewith where the transmission ECU 13 determines whether to give priority to the operation of the automatic transmission 8 or to the operation of the front clutch 5, the gear shift operation in the automatic transmission 8 and the operation of the front clutch 5 are restrained from operating at the same time.

According to another aspect of this disclosure, the transmission ECU 13 of the driving apparatus) that is determined to give priority to the operation of the front clutch 5 sends out the gear shift in stand-by state signal to the clutch ECU 12 while maintaining the automatic transmission 8 in the state where gear shift preparation has completed. The clutch ECU 12 that receives the gear shift in stand-by state signal controls the front clutch 5 to engage or to disengage. The clutch ECU 12 sends out the front clutch in steady-state signal to the transmission ECU 13 at completion of engagement or disengagement of the front clutch 5. The transmission ECU 13 that receives the front clutch in steady-state signal controls the automatic transmission 8 to shift gears. The transmission ECU 13 of the driving apparatus) that is determined to give priority to shifting gears of the automatic transmission 8 controls the automatic transmission 8 to shift gears and at the same time sends out the gear shift in progress signal to the clutch ECU 12. The clutch ECU 12 that receives the gear shift in progress signal restrains the front clutch 5 from engaging or from disengaging and maintains the front clutch 5 in the state where the preparation for the operation of the front clutch 5 has completed. The transmission ECU 13 sends out the steady-state signal to the clutch ECU 12 in the state where gear shift of the automatic transmission 8 has completed. The clutch ECU 12 that receives the steady-state signal controls the front clutch 5 to engage or to disengage.

Upon the arrangement described herewith where each of the front clutch 5 and the automatic transmission 8 are maintained in a state where preparation for the operation has completed, the operation of each of the front clutch 5 and the automatic transmission 8 may be promptly initiated when each of the front clutch 5 and the automatic transmission 8 is released from the state where the operation is restrained.

According to further aspect of this disclosure, the transmission ECU 13 of the driving apparatus 1, on determining whether priority is given to the operation of the front clutch 5 or to shifting gears of the automatic transmission 8, gives priority to engaging the front clutch 5 in a situation where the front clutch 5 is in the disengaged state, the request amount of driving power has increased while the motor generator 6 is in the regenerating state, and the rotational driving force from the engine 2 is to be added to the driving wheels 18R, 18L by engaging the front clutch 5.

Accordingly, the rotational driving force from the engine 2 is promptly added to the driving wheels 18R, 18L so that the driving force is promptly increased.

According to another aspect of this disclosure, the transmission ECU 13 of the driving apparatus 1, on determining whether priority is given to the operation of the front clutch 5 or to shifting gears of the automatic transmission 8, gives priority to shifting gears in a situation where the front clutch 5 is in the disengaged state and the vehicle running in low speed decreases the vehicle speed V while the motor generator 6 is in the regenerating state.

Upon the arrangement described herewith, the shift shock caused by the one-way clutch rapidly engaging at the gear stage after the gears are shifted, the shift shock that occurs in the state where the gear shift is delayed, may be prevented. In addition, the arrangement described herewith prevents the vehicle from the state where the automatic transmission is unable to shift down to the 1st gear until the vehicle comes to stop.

According to further aspect of this disclosure, the transmission ECU 13 of the driving apparatus 1, on determining whether priority is given to the operation of the front clutch 5 or to shifting gears of the automatic transmission 8, gives priority to disengaging the front clutch 5 in a situation where the front clutch 5 is in the engaged state, the request amount of driving power becomes zero, and the front clutch 5 is to be disengaged to bring the motor generator 6 in the regenerating state.

Accordingly, the engine 2 and the motor generator 6 are promptly disengaged so that losing regenerative energy due to the rotation of the engine 2 may be prevented.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

The invention claimed is:

1. A hybrid vehicle driving apparatus, comprising:
an engine providing rotational driving power to driving wheels;
a motor generator arranged between the engine and the driving wheels, the motor generator operating as an electric motor providing rotational driving power from the motor generator to the driving wheels and as a generator;
a front clutch arranged between the engine and the motor generator, the front clutch that selectively switches the engine and the motor generator between a rotary engagement state and a disengaged state;
an automatic transmission arranged between the motor generator and the driving wheels, the automatic transmission including an input shaft where the rotational driving power from the motor generator is provided as an input and an output shaft in rotary engagement with the driving wheels, the automatic transmission that selectively switches between a plurality of gear shift stages provided with different gear ratios from one another, the gear ratio, which is a value obtained by dividing number of rotations at the input shaft by number of rotations at the output shaft;
a clutch control device that selectively engages the engine and the motor generator by sending out a first control signal to the front clutch to operate the front clutch; and
an automatic transmission control device that selectively switches the gear shift stages between the plurality of gear shift stages by sending out a second control signal to the automatic transmission to control gear shift, wherein
the clutch control device and the automatic transmission control device are connected to mutually communicate, wherein
the clutch control device sends out a request to wait gear shift to the automatic transmission control device in a state where preparation for an operation of the front clutch is in progress, and wherein
the automatic transmission control device that receives the request to wait gear shift determines whether priority is given to engaging or disengaging the front clutch or to shifting gears of the automatic transmission.

2. The hybrid vehicle driving apparatus according to claim 1, wherein
the automatic transmission control device that is determined to give priority to the operation of the front clutch sends out a gear shift in stand-by state signal to the clutch control device while maintaining the automatic transmission in a state where gear shift preparation has completed,
the clutch control device that receives the gear shift in stand-by state signal controls the front clutch to engage or to disengage,
the clutch control device sends out a front clutch in steady-state signal to the automatic transmission control device at completion of engagement or disengagement of the front clutch,
the automatic transmission control device that receives the front clutch in steady-state signal controls the automatic transmission to shift gears, and wherein
the automatic transmission control device that is determined to give priority to shifting gears of the automatic transmission controls the automatic transmission to shift gears and at the same time sends out a gear shift in progress signal to the clutch control device,
the clutch control device that receives the gear shift in progress signal restrains the front clutch from engaging or from disengaging and maintains the front clutch in a state where the preparation for the operation of the front clutch has completed,
the automatic transmission control device sends out a steady-state signal to the clutch control device in a state where gear shift of the automatic transmission has completed,
the clutch control device that receives the steady-state signal controls the front clutch to engage or to disengage.

3. The hybrid vehicle driving apparatus according to claim 1, wherein the automatic transmission control device, on determining whether priority is given to the operation of the front clutch or to shifting gears of the automatic transmission, gives priority to engaging the front clutch in a situation where the front clutch is in a disengaged state, a request amount of driving power has increased while the motor generator is in a regenerating state, and a rotational driving force from the engine is to be added to the driving wheels by engaging the front clutch.

4. The hybrid vehicle driving apparatus according to claim 1, wherein the automatic transmission control device, on determining whether priority is given to the operation of the front clutch or to shifting gears of the automatic transmission, gives priority to shifting gears in a situation where the front clutch is in a disengaged state and a vehicle running in low speed decreases a vehicle speed while the motor generator is in the regenerating state.

5. The hybrid vehicle driving apparatus according to claim 1, wherein the automatic transmission control device, on determining whether priority is given to the operation of the front clutch or to shifting gears of the automatic transmission, gives priority to disengaging the front clutch in a situation where the front clutch is in an engaged state, the request amount of driving power becomes zero, and the front clutch is to be disengaged to bring the motor generator in the regenerating state.

* * * * *